Patented Aug. 13, 1940

2,211,593

UNITED STATES PATENT OFFICE 2,211,593

METHOD OF WEATHERPROOFING ARTICLES CONTAINING CALCIUM SULPHATE

Henry Seymour Colton, Shaker Heights, and Mahlon J. Rentschler, Willoughby, Ohio, assignors to said H. Seymour Colton, said M. J. Rentschler, and J. A. Weeks, Shaker Heights, Ohio, as trustees No Drawing. Application April 14, 1938, Serial No. 202,140

4 Claims. (Cl. 91—68)

This invention relates to a method of weatherproofing articles containing calcium sulphate. The invention is intended primarily for use upon a molded or pressed material made from waste sulphuric acid pickle liquor. As described in Patent No. 2,165,344, issued to Henry Seymour Colton on July 11, 1939, that material has a content of calcium sulphate and ferric hydroxide. It is compacted or molded to the form desired, and dried, its density and strength being dependent to a considerable extent upon the degree of pressure to which it is subjected. For some purposes it is desirable that this material be resistant to moisture in a high degree.

The present invention consists primarily in treating the aforesaid calcium sulphate and iron hydroxide material with some chemical which is capable of combining with calcium sulphate to form a calcium salt that is less soluble than calcium sulphate. The chemical used must also be either non-reactive with iron hydroxide, or if reactive it must not form a soluble iron compound. The application of the chemical in question may be effected by soaking or boiling the article to be treated in a bath of the chemical, or by applying the chemical to the surface of the article with a brush, sponge, swab or the like. Examples of chemicals which may be used are sodium silicate, sodium phosphate, phosphoric acid, tannic acid and chromic acid. All of these solutions form calcium salts which are much more insoluble than calcium sulphate.

If the formed and dried object or mass be treated with a weak solution of a chemical such as sodium silicate or phosphoric acid, for example a 1% or 2% solution, the solution will penetrate the object and weatherproof and harden it practically throughout its thickness or extent, thereby covering or surrounding each particle of calcium sulphate with a film or skin of insoluble or substantially insoluble material. However, if we take strong solutions of the same chemicals, containing for example 25% or more of active ingredients, then the reaction becomes nearly instantaneous, and it forms a hard protective shell on the outside of the object, thereby making further penetration of the object by the solution quite difficult.

We have found additionally that it is possible to color the object at the same time that it is rendered weatherproof, and without any additional operation. This is accomplished by mixing into the weatherproofing solution a pigment, such for example as titanium dioxide (white), ultra marine blue, or the like, and then applying the mixture to the object in either of the two ways above specified. This treatment, it has been found, produces a desirable and lasting colored coating which cannot be washed off with water and may be heated to at least a bright red heat without destroying the color.

We find it advantageous to fire the thus treated object, as the firing helps to complete the reaction and has a toughening effect on the article. It is however by no means essential.

Having thus described our invention, we claim:

1. The process of weatherproofing a dried mass made by joint precipitation from waste sulphuric acid pickle liquor and containing calcium sulphate and ferric hydroxide, which comprises applying thereto a solution of sodium silicate.

2. The process of weatherproofing and hardening a dried mass made by joint precipitation from waste sulphuric acid pickle liquor and containing calcium sulphate and ferric hydroxide, which comprises boiling the said mass in a solution of sodium silicate.

3. The process of weatherproofing a formed and dried mass resulting from a joint precipitate in waste sulphuric acid pickle liquor of calcium sulphate and iron hydroxide, which comprises applying to the formed and dried mass a solution of sodium silicate, whereby the particles of said mass at and near the surface at least become coated with a protecting and hardening skin of calcium silicate.

4. The process of forming weatherproofed molded material from waste sulphuric acid pickle liquor, which comprises the formation of a joint precipitate of calcium sulphate and iron hydroxide, compacting and molding the joint precipitate, causing the same to dry and set and thereby converting the hydroxide to the ferric state, and thereafter applying to the formed and dried mass a solution of sodium silicate.

HENRY SEYMOUR COLTON.
MAHLON J. RENTSCHLER.